Figure 1:
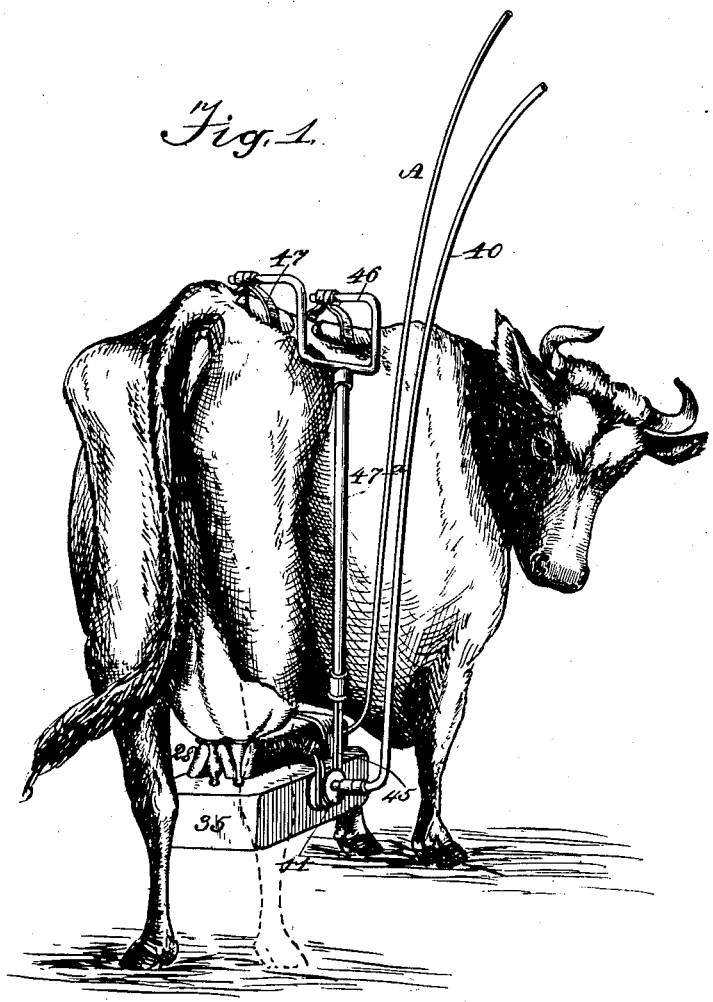

P. F. KLEIN.
MILKING MACHINE.
APPLICATION FILED OCT. 7, 1908.

925,196.

Patented June 15, 1909.
5 SHEETS—SHEET 1.

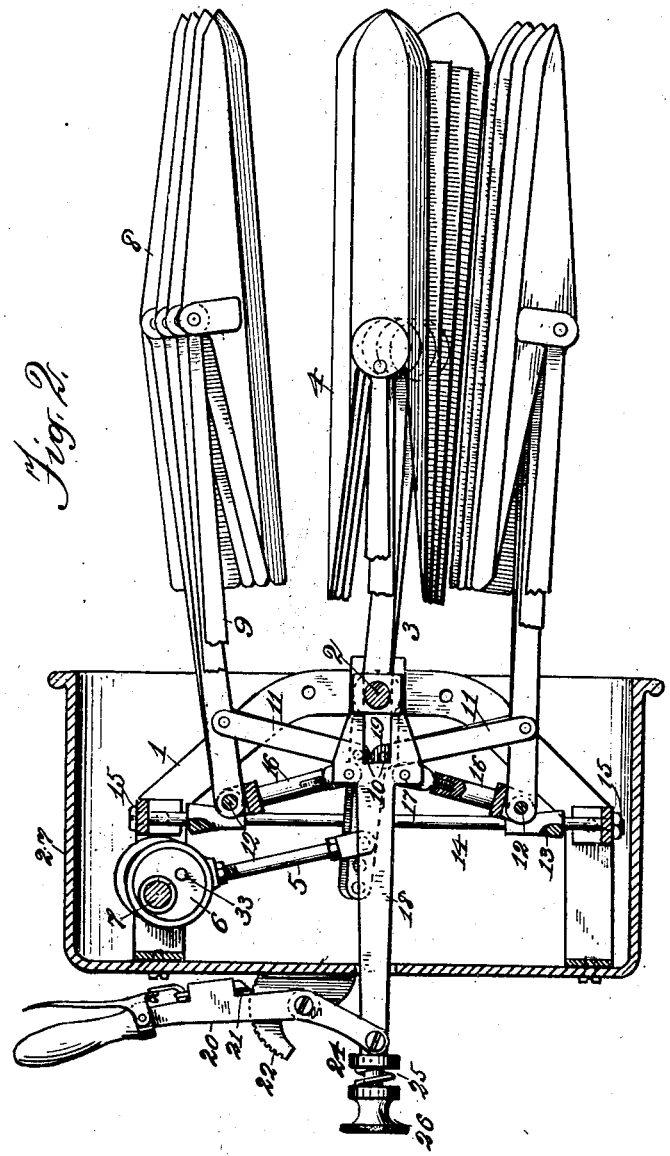

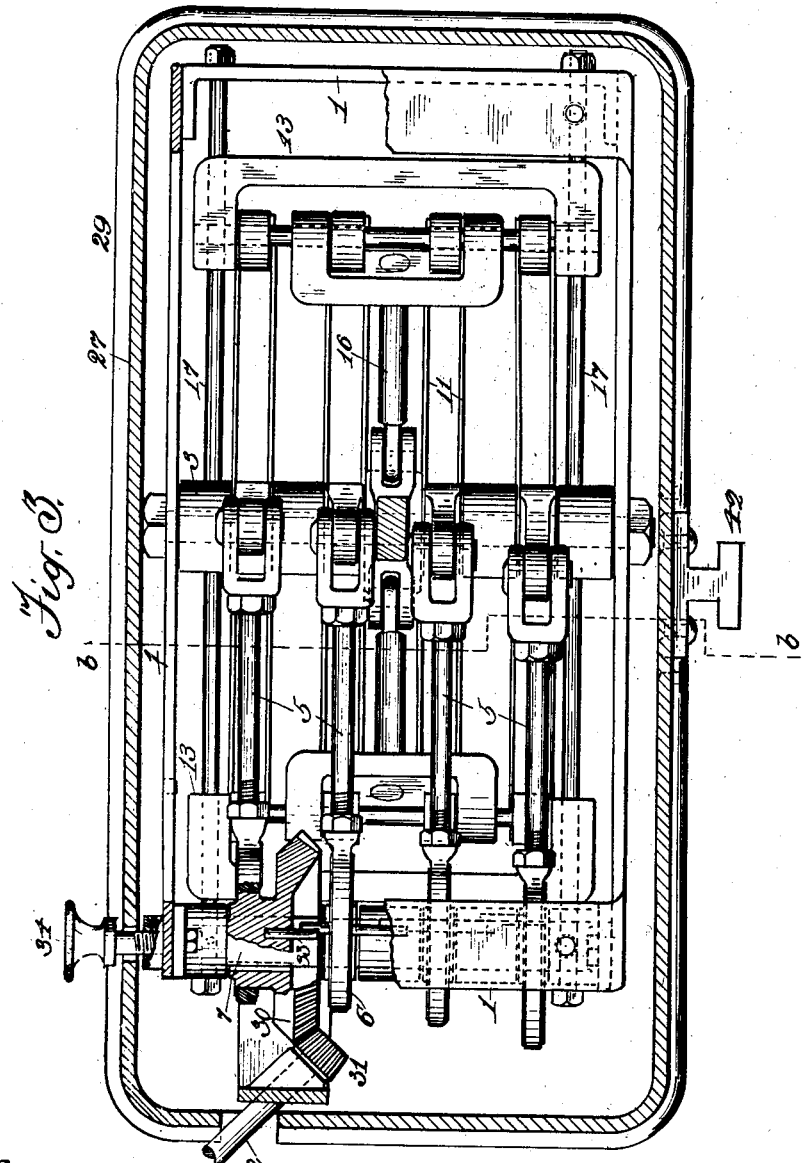

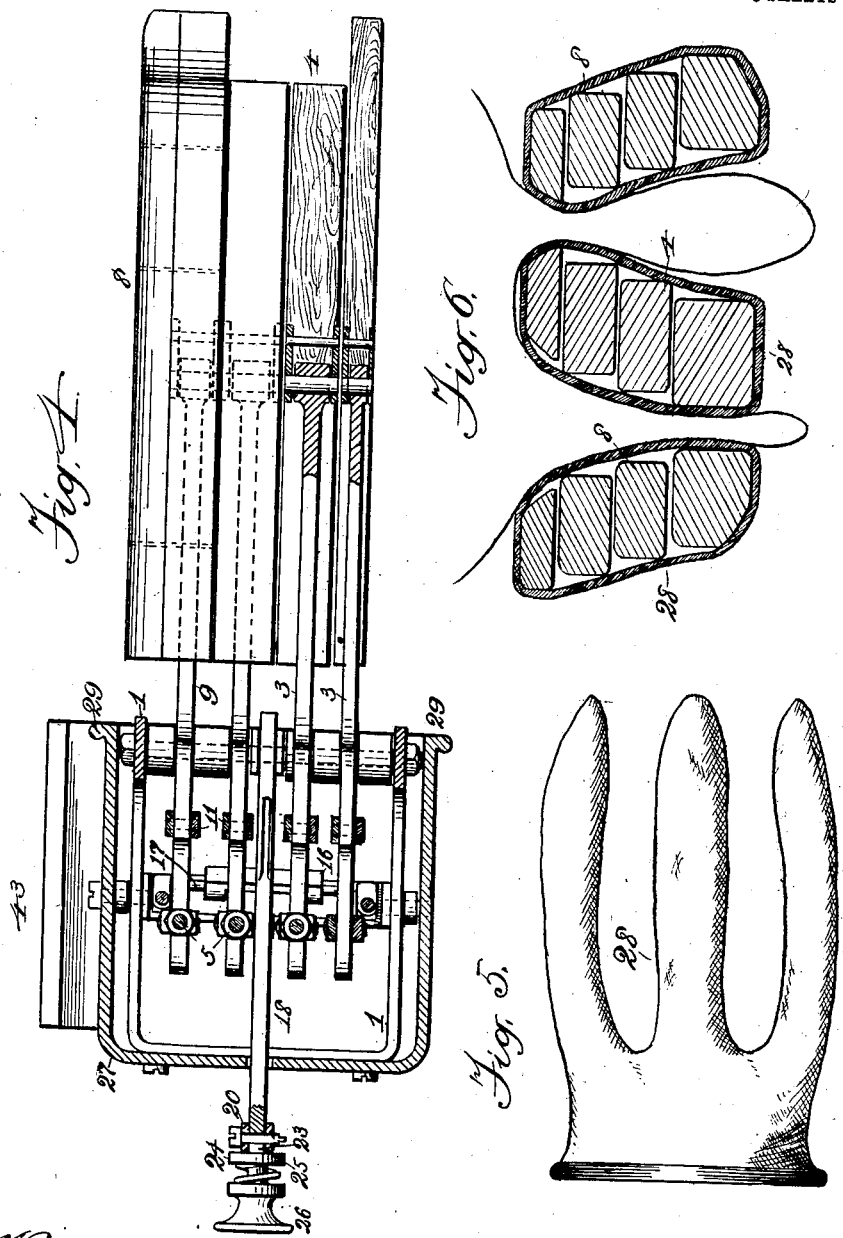
P. F. KLEIN.
MILKING MACHINE.
APPLICATION FILED OCT. 7, 1908.
925,196.
Patented June 15, 1909.
5 SHEETS—SHEET 4.

P. F. KLEIN.
MILKING MACHINE.
APPLICATION FILED OCT. 7, 1908.
925,196.
Patented June 15, 1909.
5 SHEETS—SHEET 5.
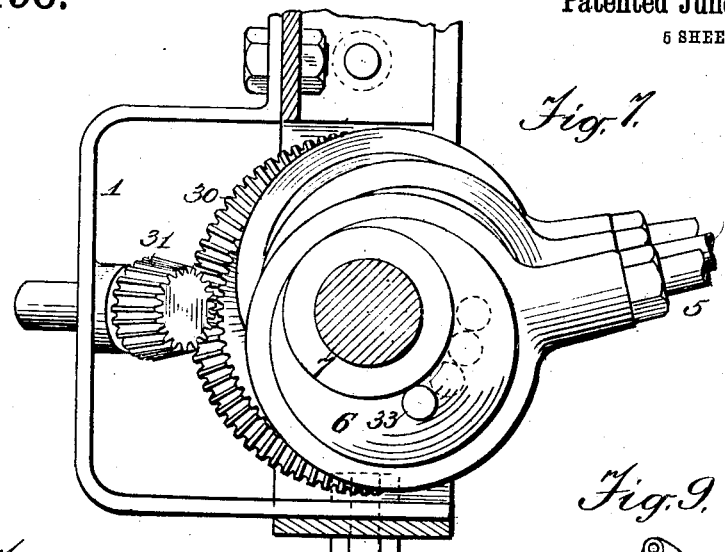
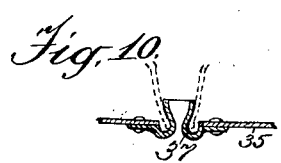
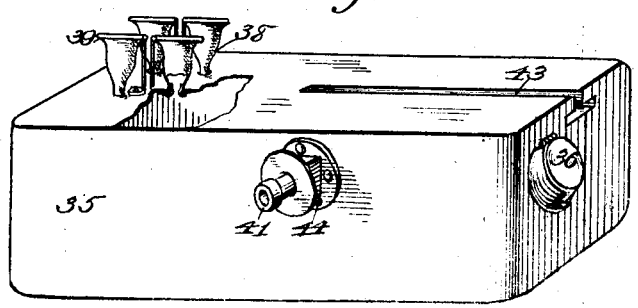
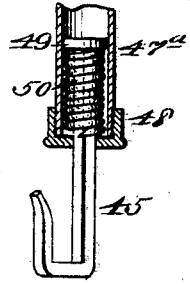
Witnesses:
L. A. St. John
J. L. Clarke
Inventor
Peter F. Klein
By J. M. St. John
Atty

UNITED STATES PATENT OFFICE.

PETER F. KLEIN, OF MARION, IOWA.

MILKING-MACHINE.

No. 925,196.

Specification of Letters Patent.

Patented June 15, 1909.

Application filed October 7, 1908. Serial No. 456,533.

*To all whom it may concern:*

Be it known that I, PETER F. KLEIN, a citizen of the United States, residing at Marion, in the county of Linn and State of Iowa, have invented certain new and useful Improvements in Milking - Machines, of which the following is a specification.

The object of this invention is to produce a milking machine so constructed and arranged as to closely simulate the action of a milkman's fingers in hand milking, the inward pressure on the cow's teats being applied progressively from the udder downwardly, and with provision for adjustment so as to perform its operations rapidly, but without discomfort or injury to the cow.

The invention also contemplates a cleanly and sanitary handling of the milk in the act of milking, and other useful features, all of which will be more fully hereinafter set forth and claimed.

In the accompanying drawing, forming a part of this specification, Figure 1 represents the machine as in use and applied to a cow, one leg of which is broken away, the better to show the apparatus. Fig. 2 is a top view, partly in section, showing the construction and arrangement of the fingers and connected mechanism. Fig. 3 is a view of the same as seen from in front (the lower end of Fig. 2), parts being in section to show clearly the driving mechanism and other apparatus. Fig. 4 is a section of the same, taken on the line *b b*, but inverted. Fig. 5 represents a rubber glove to inclose the finger of the machine when in use. Fig. 6 is a sectional-view showing the action of the fingers with respects to the cow's teats. Fig. 7 shows in detail the construction and arrangement of the eccentrics which actuate the fingers, and related mechanism. Fig. 8 shows a milk receptacle to which the milking machine may be attached and means for applying a moderate suction. Fig. 9 is a section of the air-tight outlet of this receptacle. Fig. 10 shows the manner of attaching the suction cups to the receptacle. Fig. 11 is a sectional view, showing means for suspending the milking machine from the cow's back.

Referring now to the drawings, the numeral 1 designates a skeleton frame carrying the various working parts hereafter to be described. On a shaft 2 mounted between the top and bottom curved portions of this frame is mounted a group (in this case of four) finger-levers 3, to the rearward ends of which are pivoted broad fingers 4, near the middle of said fingers. In order to give the desired play to the fingers, and at the same time admit of a vertically central pivoting of the levers, the fingers are forked forwardly, as shown. The forward ends of the levers connect by links 5 with as many eccentrics 6 on a shaft 7 mounted in suitable bearings in the frame. It will be noted that these eccentrics are set at different angles on the shaft, and progressively from top to bottom, or vice versa. The effect of this is, of course, to move the fingers in either direction in a progressive or successive order. At a suitable distance from the central group of fingers, each side, is an outer group 8, also centrally pivoted to levers 9, which connect with the middle levers at 10 by links 11. The forward ends of these levers are pivoted to shafts 12 attached to fulcrums 13 mounted on guide-shafts 14 secured to the frame by nuts 15 (Fig. 3). Connected with each fulcrum is a link 16 in the nature of a tee-shaped stirrup, the single, inner end of which is pivoted at 17 to a slide 18, slotted at 19 to straddle the shaft 2, and adapted to be moved back and forth by a lever 20 having a pawl 21 engaging a notched sector 22. The purpose of this slide, as will be evident is to move the outer groups of fingers inwardly or outwardly with respect to the middle fingers, as is necessary in applying the machine to a cow's teats and adjusting it to the proper pressure thereon. This pressure is rendered elastic by pivoting the lever 20 through a slot 23 in the stem of the slide 18, and outside of the end of the lever providing a slip collar 24, with a spring 25 to force it against said lever by means of a thumb-screw 26 on the threaded end of said stem.

It will be evident that the construction is such that the fingers are made to close on the teat from the udder downwardly in a regular succession, thus forcing the milk down and out by an action very similar to that of a man's fingers. This action is clearly illustrated in Fig. 6, the fingers at the right taking the milking position, while those at the left are open to permit the teat to fill. These in turn assume the milking position, when those at the right will in the same manner open to the right teats to fill. It is to be understood that each group of fingers embraces two teats, a front and a back teat, and that the machine when in use is placed under the cow's udder and belly, with fingers extending toward the rear, as shown in Fig. 1.

For the sake of cleanliness chiefly, the working parts of the machine are inclosed in a case 27, suitably attached to the main frame. For the same reason, and also to cushion the fingers, a rubber glove 28 is provided, having a finger for each group of fingers, and with a wrist adapted to strip over the back edge of the case, which is provided with a bead 29 to hold the glove in position.

In order that the machine may be applied to a cow's teats as easily and quickly as possible it is desirable that the fingers be brought into practical alinement. This in the case of fixed eccentrics would be impossible. Accordingly the eccentrics, except one, are mounted loosely on their shaft. The fixed eccentric is here shown as an integral part of a bevel gear 30 made fast to the shaft, and meshing a small pinion 31 on a diagonal shaft 32, to which motion is supposed to be transmitted in some suitable way, as by the familiar flexible shaft, A. Extending from the inner face of the bevel gear is a stud 33, and a similar stud projects from each eccentric. These studs are so set that when the shaft and gear are turning in the working direction the eccentrics take the varying positions on the shaft heretofore mentioned. But when not in use the operator, by means of a rose-wheel 34 attached to the shaft, may turn it back in the opposite direction, when all the eccentrics are brought nearly into alinement as regards their longer radii, and correspondingly the fingers are brought into similar alinement.

To obtain the best results a little suction should accompany the action of the fingers. This closely simulates the work of a calf's mouth, probably the best of all milkers, as regards the well being of the cow. With this in view I provide a milk receptacle 35, having a nozzle 36 which may be hermetically closed. Near the back end of this vessel, attached to suitable nipples 37, are set rubber teat-cups 38 suitably supported at the upper ends, as by wire rings 39 with depending stems attached to the vessel. These cups receive the teats, which are drawn into air-tight connection with them when suction is applied to the interior of the milk receptacle. This may be done by any suitable pumping or exhausting mechanism (not shown), through a hose 40 attached to a nipple 41. The milking machine rests on top of this receptacle, connected therewith as by a tee- 42 fitting a corresponding channel 43 in the receptacle. When in operative position the fingers embrace the cups in the same manner as they are shown embracing the teats in Figs. 1 and 6.

A simple support for the machine is shown in Figs. 1, 8 and 11. The outer side of the milk receptacle is provided with a square boss 44, and fitting this is a hook 45 forming the lower end of a supporting device hanging from the cow's back. This comprises a forked bracket 46 having depending, forked and padded feet 47 to straddle the cow's backbone. From the bracket depends a tubular stem $47^a$ terminating in a cap 48 having a square hole, to prevent the hook-stem, which passes through it, from turning. At the upper end of the hook-stem is a round head 49 fitting the inside of the tube, and between this head and the lower cap is a compression spring 50, strong enough to support the whole milking mechanism, and hold it firmly in position. The apparatus may be placed in position very quickly, as the operator has only to hang the bracket on the cow's back, and then with one hand draw down the hook, and with the other hang the milking machine thereon. So suspended it is now easy to place the teats in proper position with respect to the machine, so that little time is consumed in making ready for the machine to do its work.

Having thus described my invention, I claim:

1. In a milking machine, the combination of independent fingers arranged in groups, each opposing group being adapted to embrace two teats, and mechanism adapted to impart to said fingers separately a progressively inward movement from top to bottom of the group.

2. In a milking machine, the combination of independent fingers arranged in groups, each pair of opposing groups being adapted to embrace two teats, levers yieldingly connected separately with said fingers, and mechanism adapted to impart to said levers a compressing movement progressively from top to bottom of the groups.

3. In a milking machine, the combination of independent fingers arranged in groups, each pair of opposing groups being adapted to embrace a plurality of teats, levers separately engaging said fingers intermediate of their teat contacts, and mechanism adapted to impart to said levers a successive inward movement proceeding from the upper pair downwardly.

4. In a milking machine, the combination of independent fingers arranged in a plurality of groups, each opposing pair of groups being adapted to embrace a plurality of teats, and mechanism adapted to separately impart to each pair of groups alternately a compressing inward movement on the teats, proceeding from top to bottom of the groups.

5. In a milking machine, the combination of groups of independent fingers, each pair of groups being adapted to embrace a plurality of teats, and mechanism adapted to separately impart to said fingers reciprocating movement, proceeding successively from top to bottom of each group, whereby the fingers close on the teats in regular succession from the udder downwardly to expel the milk, and open in the same order to permit the teats to fill again.

6. In a milking machine, the combination of groups of independent fingers arranged substantially as described, levers pivoted separately to said fingers at their practical centers, a rotating shaft provided with a series of eccentrics, or the like, set at progressively differing angles of thrust, and links connecting said eccentrics with said levers.

7. In a milking machine, the combination of independent fingers constructed and arranged substantially as described, levers pivotally connecting separately with said fingers, a rotating shaft provided with a series of eccentrics or the like set at different angles of thrust, links connecting said eccentrics with the middle group of levers, links connecting the outer groups of levers with the middle levers, and adjustable fulcrums for the outer levers, substantially as and for the purpose set forth.

8. In a milking machine, the combination of independent fingers constructed and arranged substantially as described, levers pivotally connecting separately with said fingers, actuating mechanism adapted to reciprocate the middle group of levers, links connecting the outer groups with the middle group, sliding fulcrums for said outer groups, and an adjustable connection with each set of fulcrums, whereby they may be simultaneously moved inwardly or outwardly to shift the outer groups of fingers.

9. In a milking machine, the combination of groups of independent fingers constructed and arranged substantially as described, levers pivoted separately thereto, mechanism to impart reciprocating movement linked to the middle group of levers, links connecting said middle levers with the outer levers, and yieldingly adjustable fulcrums for said outer levers, substantially as set forth.

10. In a milking machine, the combination of fingers levers and links, substantially as described, a rotating shaft, a series of eccentrics mounted on said shaft and engaging said links, all but one of the eccentrics being loose on the shaft, and mutually engaging studs projecting from said eccentrics, whereby they take differing angles of thrust when in operative position, and may be brought into practical alinement by turning the shaft backwardly.

11. In a milking machine, the combination of milking fingers and actuating mechanism, substantially as described, an inclosing case for all but the fingers, and an elastic glove to cover all the fingers and connect with said case.

12. In a milking machine and in combination with the milking mechanism, a support therefor, comprising an adjustable bracket adapted to rest on the cow's back, a depending member, a hook, or the like, adapted to engage the milking mechanism, and a spring connecting said hook with the supporting bracket, and adapted to support the milking mechanism.

13. The described support for a milking machine, comprising an adjustable bracket with padded feet to rest on the cow's back, a tubular depending member having a suitable cap at its lower end, a hook or the like passing through said cap, and having a headed stem sliding in the tube, and a compression spring interposed between said head and cap.

In testimony whereof I affix my signature in presence of two witnesses.

PETER F. KLEIN.

Witnesses:
J. M. ST. JOHN,
E. E. ROTHROCK.